Dec. 3, 1963  D. SHEROCK  3,112,862
SOLAR OPERATED DEVICE
Filed May 15, 1963

INVENTOR.
DUANE SHEROCK
BY Edward M. Apple
ATTORNEY

United States Patent Office 3,112,862
Patented Dec. 3, 1963

3,112,862
SOLAR OPERATED DEVICE
Duane Sherock, 32190 Five Mile Road, Livonia, Mich.
Filed May 15, 1963, Ser. No. 280,640
5 Claims. (Cl. 230—48)

This invention relates to machines for converting the heat from the sun's rays to mechanical energy for doing useful work.

I am aware of the fact that others have taught the use of solar energy for doing useful work, but machines for that purpose heretofore disclosed to the public have been complicated and expensive to manufacture, and have not proven satisfactory. It is therefore an object of this invention to overcome such difficulties.

Another object of the invention is to provide a mechanism which absorbs heat from the sun, utilizes the heat to expand a gas in a closed circuit, which expanded gas motivates a reciprocable member, which in turn compresses air in a second closed circuit, which compressed air may then be employed for useful purposes.

Another object of the invention is to generally improve solar operated machines, and to provide a device of that character, which is simple in construction, economical to manufacture, and efficient in operation.

The foregoing and other objects and advantages of the invention will become more apparent as the description proceeds, reference being made from time to time to the accompanying drawings, forming part of the within disclosure, in which drawings.

Figure 1:
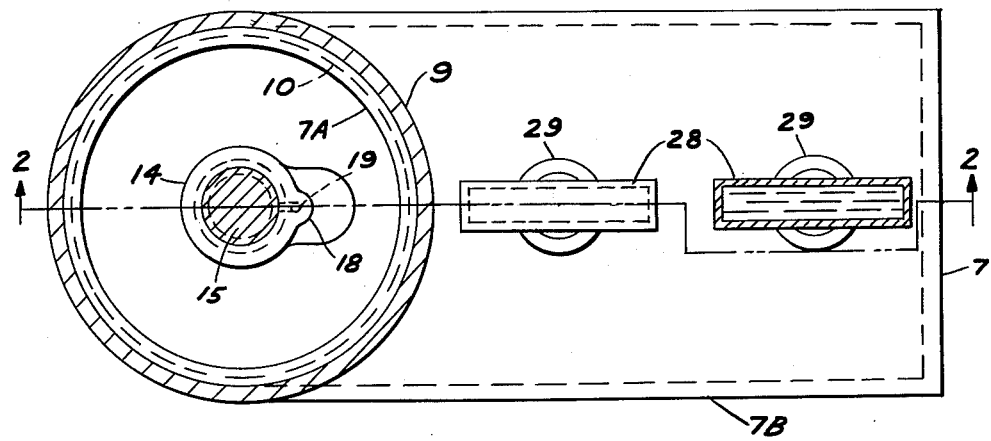
FIG. 1 is a top plan view, with parts in section, of a device embodying the invention, and taken substantially on the line 1—1 of FIG. 2.
Figure 2:
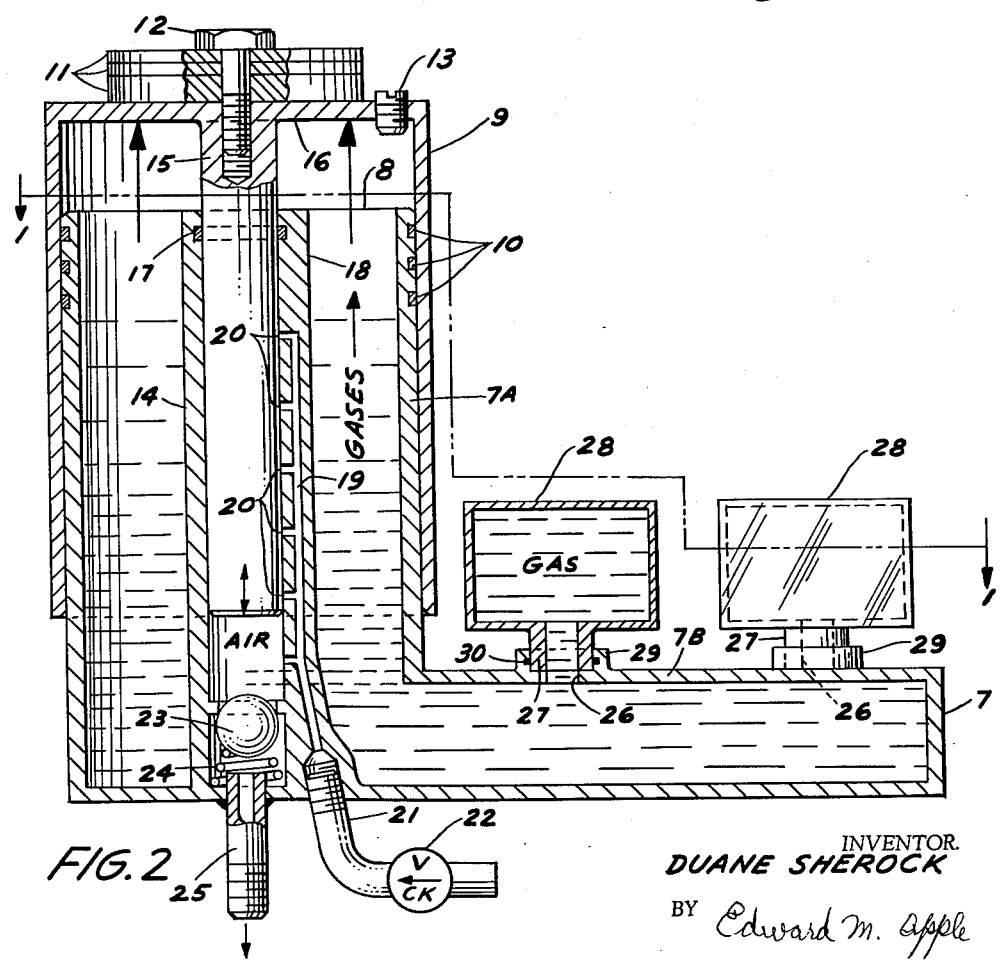
FIG. 2 is a section taken substantially on the line 2—2 of FIG. 1.

Referring now more particularly to the drawings, it will be understood that in the embodiment herein disclosed, the reference character 7 indicates a substantially L-shaped container which is filled with a suitable gas having a high coefficient of expansion. The vertical leg 7A of the container 7 is open at the top as at 8, which opening is covered by means of a telescoping member 9 which is reciprocable on the walls of the member 7A. The members 7A and 9 are made gas-tight by means of sealing rings 10. Superimposed on the top of the member 9 is a plurality of weights 11, which are held in position by means of a threaded member 12 or other suitable means. It will be understood that the weights 11 are removable and adjustable, so that various degrees of downward pressure may be exerted on the top of the member 9 to offset the upward pressure generated on the interior of the member 9 by the expansion of the gases therein. It is also within the contemplation of the invention to make the weights 11 in receptacle form, so that water or other type of ballast may be used for weight. The member 9 is provided with a filler plug 13, so that gas on the interior of the member 9 may be replenished from time to time as occasion demands.

A cylinder 14 of reduced diameter is positioned on the interior of the member 7A and has received therein a piston 15, which is secured to and depends from the top 16 of the member 9. The piston 15 is sealed by one or more sealing rings 17. The wall 18 of the cylinder 14 is provided with a longitudinal bore 19, which is provided with transverse bores 20, which communicate with the interior of the cylinder 14, so that air may enter the cylinder 14 through the bore 19 and the conduit 21, which communicates with the atmosphere through a check valve 22. The lower end of the cylinder 14 is provided with a check valve 23, which permits compressed air to be drawn from cylinder 14 when the pressure therein is sufficient to overcome the tension of the expansion spring 24. Air is withdrawn from the cylinder 14 through the conduit 25, which may be connected to any suitable piece of machinery, which may be operated by air under compression.

Although I show the use of my device to compress air in the cylinder 14, it will be understood that the device might well be used to pump water or other liquid which may be admitted to the cylinder 14 instead of air.

The horizontal portion 7B of the member 7 is provided with a plurality of openings 26, in which openings are received the necks 27 of the heat collectors 28, which are rotatable in suitable bearing members 29, positioned on top of the member 7. The necks 27 are sealed by suitable sealing rings 30. The interiors of the members 28 are, of course, in communication with the interior of the member 7 and contain the same gas as the members 7 and 7A are charged with. The members 28 are preferably made of glass or other material, which will rapidly absorb heat from the sun's rays. The heat collectors 28 may be rotated manually or by suitable power, so that they may receive the maximum solar rays from the sun at all times. As the heat from the solar rays is absorbed by the members 28, it will expand the gas on the interiors of the members 28 and the gas on the interior of the members 7 and 7A. The expansion of the gases will exert an upward pressure on the head 16 of the member 9 causing the same to rise after overcoming the downward pressure exerted by the weight 11. The weight 11 is adjusted to permit the expanding gases to lift the member 9 to its safe maximum upper position with reference to the member 7A. The downward movement of the member 9 is limited by the upper wall of the member 7. When the maximum upward position has been reached, the heat collectors 28 are rotated out of heat-collecting position, or are shaded by a curtain or other suitable means, so that further expansion of the gases is temporarily terminated. As the members 9 and 16 are moved upwardly under the influence of the expanding gases, a partial vacuum will be created in the cylinder 14, allowing air to enter below the piston 15 through the check valve 22 and the conduits 21 and 19.

When the heat absorption through the members 28 is terminated or restricted, the gases on the interior of the device will start to contract, thereby reducing the upward pressure on the interior of the device. When the upward pressure on the interior of the device becomes less than the downward pressure exerted by the weights 11, the piston 15 will move downwardly on the interior of the cylinder 14, compressing the air in the cylinder 14, and causing it to be forced out through the check valve 23 and through the conduit 25.

From the foregoing, it will be seen that I have provided a device for intermittently absorbing heat from the sun to do useful work.

It is believed that the operation of the device is obvious from the foregoing description.

Having described my invention, what I claim and desire to secure by Letters Patent is:

1. A device of the character described comprising an open ended gas chamber, a plurality of solar heat collectors on said chamber having their interiors in communication with the interior of said chamber, a member telescopingly mounted over the open end of said chamber, and arranged to be moved in one direction by the expansion of gas in said chamber, means to move said member in the opposite direction, a cylinder in said chamber, a piston on said telescoping member received in said cylinder and air intake and exhaust passageways in communication with said cylinder.

2. The structure of claim 1, in which each of said passageways is provided with a check valve.

3. The structure of claim 1, in which the means to move said telescoping member in the opposite direction comprise variable weights.

4. The structure of claim 1, in which said heat collectors are moveably mounted for angular disposition toward the sun.

5. The structure of claim 1, in which said chamber consists of an L-shaped housing, one section of which supports said heat collectors and the other section of which encloses said cylinder.

References Cited in the file of this patent
UNITED STATES PATENTS

| | | |
|---|---|---|
| 2,092,717 | Jodry | Sept. 7, 1937 |
| 2,461,032 | Bush | Feb. 8, 1949 |